United States Patent
Zavesky et al.

(10) Patent No.: US 10,887,315 B2
(45) Date of Patent: Jan. 5, 2021

(54) DATA AND CONTEXT BASED ROLE MEMBERSHIP SYSTEM

(71) Applicant: AT&T Intellectual Property I, L.P., Atlanta, GA (US)

(72) Inventors: Eric Zavesky, Austin, TX (US); James Pratt, Round Rock, TX (US); Robert Gratz, Lockhart, TX (US); Jason Decuir, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 73 days.

(21) Appl. No.: 16/011,780

(22) Filed: Jun. 19, 2018

(65) Prior Publication Data
US 2019/0387000 A1 Dec. 19, 2019

(51) Int. Cl.
| | |
|---|---|
| H04W 60/00 | (2009.01) |
| H04L 29/06 | (2006.01) |
| H04L 29/08 | (2006.01) |
| H04L 12/24 | (2006.01) |
| G06F 16/9538 | (2019.01) |

(52) U.S. Cl.
CPC ......... *H04L 63/102* (2013.01); *H04L 41/06* (2013.01); *H04L 41/16* (2013.01); *H04L 41/28* (2013.01); *H04L 67/16* (2013.01); *G06F 16/9538* (2019.01)

(58) Field of Classification Search
CPC . H04L 29/06; H04L 29/08072; H04L 9/0367; H04W 60/00; G06F 16/9538
USPC ............... 709/203, 220, 224, 226, 228, 232
See application file for complete search history.

(56) References Cited

U.S. PATENT DOCUMENTS

| | | | |
|---|---|---|---|
| 1,023,077 A * | 4/1912 | Grout ................. | H01H 85/0208 81/3.8 |
| 8,595,799 B2 | 11/2013 | Afek et al. | |
| 9,298,933 B2 | 3/2016 | Goel et al. | |
| 9,349,022 B2 | 5/2016 | Povalyayev et al. | |
| 9,858,164 B1 * | 1/2018 | McLean .............. | H04L 41/0853 |
| 10,050,959 B2 * | 8/2018 | Soon-Shiong ........ | H04L 9/3231 |
| 10,728,107 B2 * | 7/2020 | Dennis ................ | G06F 16/2365 |
| 2006/0294598 A1 | 12/2006 | Lam et al. | |
| 2008/0163335 A1 | 7/2008 | Hagstrom | |
| 2011/0191485 A1 | 8/2011 | Umbehocker | |
| 2011/0246504 A1 | 10/2011 | Slater et al. | |
| 2014/0012616 A1 | 1/2014 | Moshenek | |
| 2015/0310393 A1 | 10/2015 | Bhaskaran et al. | |

(Continued)

*Primary Examiner* — Khanh Q Dinh
(74) *Attorney, Agent, or Firm* — BakerHostetler

(57) ABSTRACT

A data and context based role management system comprising: a community, the community including at least one data source having plural roles stored therein, the plural roles including an identity including at least one of a credential, a function, a capability, and a historic response data; a discovery module configured to identify an alert associated with an event requiring a response, the discovery module being further configured to search the community for a responder based on the event, wherein the discovery module is configured to compare a criteria based on the event to the identity associated with each of the plural roles to identify the responder; and when the responder is identified, the community promotes the responder to transform at least one device of the responder to provide at least access to data associated with the event.

20 Claims, 15 Drawing Sheets

(56) References Cited

U.S. PATENT DOCUMENTS

| | | | |
|---|---|---|---|
| 2016/0012465 A1* | 1/2016 | Sharp | G06Q 20/18 705/14.17 |
| 2016/0029316 A1* | 1/2016 | Mohan | H04M 3/4365 455/417 |
| 2016/0072800 A1* | 3/2016 | Soon-Shiong | H04L 63/0861 726/7 |
| 2016/0216229 A1* | 7/2016 | Okamoto | G01N 27/419 |
| 2017/0006118 A1* | 1/2017 | Dennis | H04L 41/22 |
| 2017/0161439 A1* | 6/2017 | Raduchel | G06Q 10/063 |
| 2017/0220985 A1* | 8/2017 | White | H04L 67/125 |
| 2017/0300633 A1 | 10/2017 | Simon et al. | |
| 2017/0308841 A1 | 10/2017 | Swaminathan et al. | |
| 2017/0339148 A1 | 11/2017 | Syomichev et al. | |
| 2018/0054428 A1 | 2/2018 | Appel et al. | |
| 2019/0205552 A1* | 7/2019 | Espinosa | G06F 16/9538 |
| 2019/0342851 A1* | 11/2019 | Shan | H04W 60/00 |

* cited by examiner

DATA AND CONTEXT BASED ROLE MEMBERSHIP SYSTEM

TECHNICAL FIELD

The invention relates to networked resources, and more particularly to a data and context based role membership system that searches for a responder within a community that includes members having a role, and promotes a member of the community to receive data access and priority to act as the responder to an event.

BACKGROUND

As data and responsibilities (skills and access rights) are increasingly digital, the response time and latency to convey both need to be reduced. Currently, these tasks are slowly executed or approved by humans and often require several levels of managerial approval. Additionally, the ability to assign functional attributes (e.g. those that can manipulate a device or network capability) to a temporary group are currently unavailable, but can be a critical benefit to a service provider's solution for a highly responsive and dynamic network. A need exists for roles and data to be opportunistically assigned based on a temporary need so that individuals within a physical area can be temporary proxies while more authoritative or skilled individuals are requested.

This disclosure is directed to solving one or more of the problems in the existing technology.

SUMMARY

According to an example, the disclosure generally a data and context based role management system comprising: a community, the community including at least one data source having plural roles stored therein, the plural roles including an identity including at least one of a credential, a function, a capability, and a historic response data; a discovery module configured to identify an alert associated with an event requiring a response, the discovery module being further configured to search the community for a responder based on the event, wherein the discovery module is configured to compare a criteria based on the event to the identity associated with each of the plural roles to identify the responder; and when the responder is identified, the community promotes the responder to transform at least one device of the responder to provide at least access to data associated with the event.

Another example includes a network device comprising: a processor, an input/output device coupled to the processor, and a memory coupled with the processor, the memory comprising executable instructions that when executed by the processor cause the processor to effectuate data and context based role management operations comprising: instantiating a community within a network, the community including plural roles; when an alert indicating an event requiring a response is detected by a discovery module, obtaining cloud data from a device associated with the event, searching the community to identify a responder from the plural roles, promoting the responder to provide access to the cloud data, and dispatching the responder to the event.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

A data and context based management system is generally indicated by the number 200 in the accompanying drawings. The system 200 generally includes an opportunistic individual discovery module with partial fulfillment of skill requirements, automated method to give or modify roles and take away later (including an audit log of all role transactions in public blockchain), and attributes of role as a capability to alter network or connected devices. According to the disclosure, system 200 defines a community by coupling data assets (e.g. databases, APIs, etc) as well as functional privileges (e.g. ability to authorize purchases for a group, get prioritized data or network services, etc).

As described in more detail below, system 200 may alter access to data, functionality and service access across a network. The network may include a telecommunications network, software defined network, local area network, and the like. Examples of various networks are provided in connection with FIGS. 4-10 and described below. The edge orchestration system 200 in the following description may be implemented within one or more of the various networks. Moreover, as discussed more completely below, system 200 may be instantiated as a network device within such networks or a virtual network function on a network.

Figure 1A:
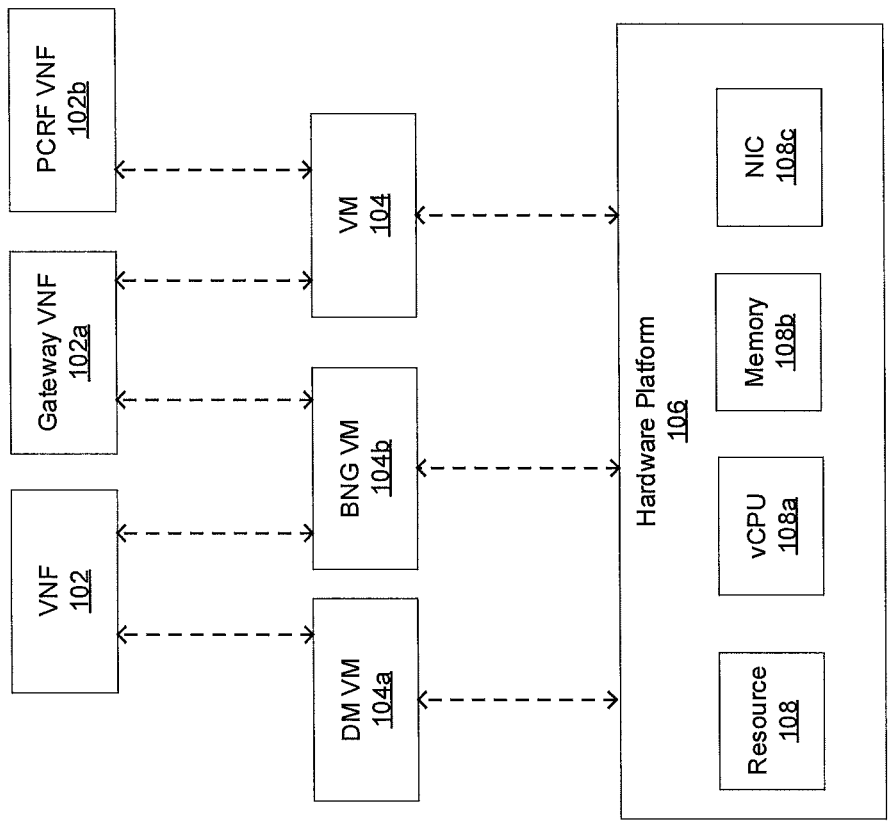
FIG. 1A is a representation of an exemplary network.

FIG. 1A is a representation of an exemplary network 100. Network 100 may comprise a software defined network or SDN—that is, network 100 may include one or more virtualized functions implemented on general purpose hardware, such as in lieu of having dedicated hardware for every network function. General purpose hardware of network 100 may be configured to run virtual network elements to support communication services, such as mobility services, including consumer services and enterprise services. These services may be provided or measured in sessions.

A virtual network function(s) (VNF) 102 may be able to support a limited number of sessions. Each VNF 102 may have a VNF type that indicates its functionality or role. For example, FIG. 1A illustrates a gateway VNF 102a and a policy and charging rules function (PCRF) VNF 102b. Additionally or alternatively, VNFs 102 may include other types of VNFs including but not limited to security, routing, wide area network (WAN) optimization and others within a service providers virtual network offerings. According to the example, VNF 102 may estimate a buffer condition as described more completely below.

Each VNF 102 may use one or more virtual machine (VM) 104 to operate. Each VM 104 may have a VM type that indicates its functionality or role. For example, FIG. 1A illustrates a discovery module (DM) VM 104a and a broadband network gateway (BNG) VM 104b. Additionally or alternatively, VM 104 may include other types of VMs. Each VM 104 may consume various network resources from a hardware platform 106, such as a resource 108, a virtual central processing unit (vCPU) 108a, memory 108b, or a network interface card (MC) 108c. Additionally or alternatively, hardware platform 106 may include other types of resources 108.

Figure 1B:
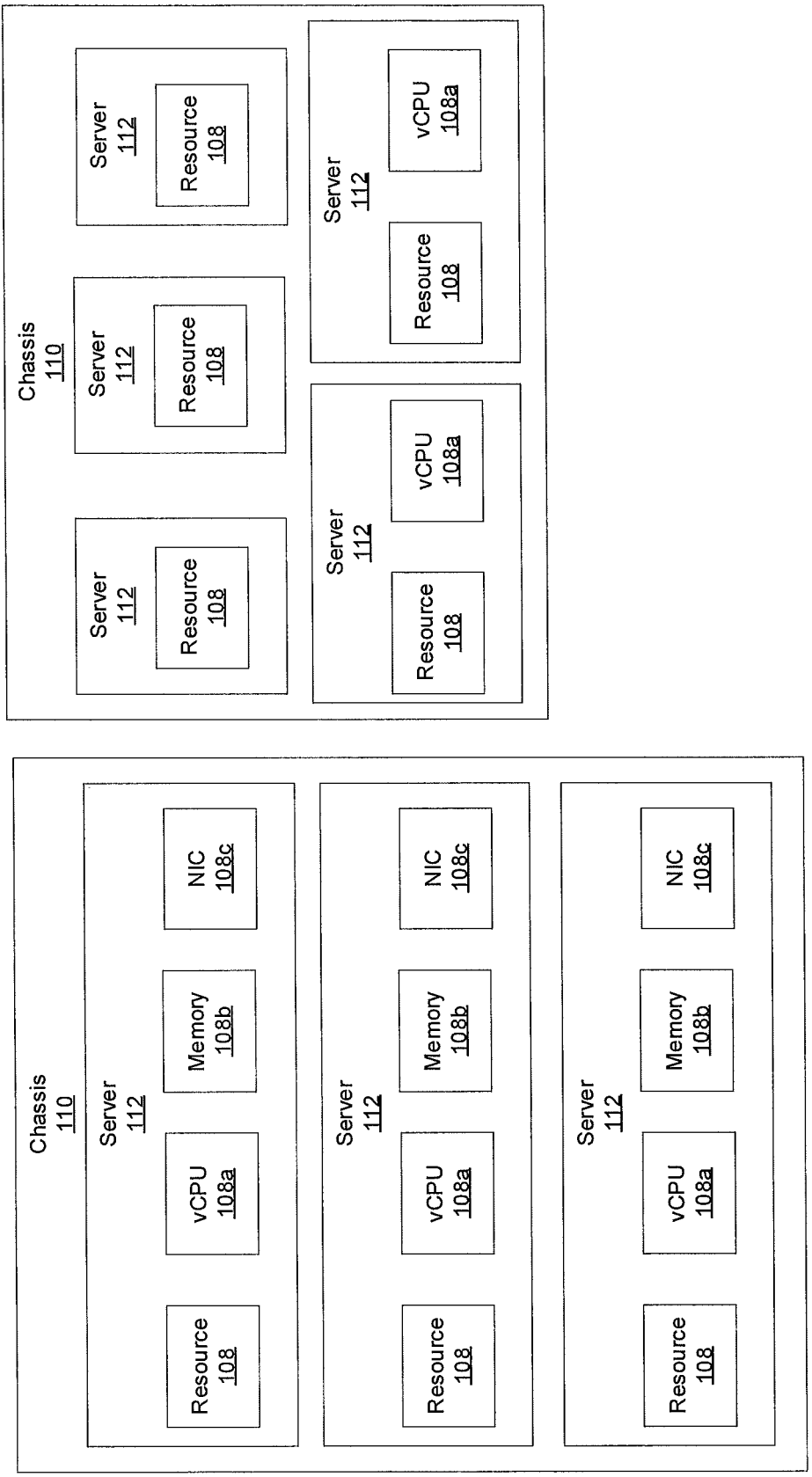
FIG. 1B is a representation of an exemplary hardware platform.

While FIG. 1A illustrates resources 108 as collectively contained in hardware platform 106, the configuration of hardware platform 106 may isolate, for example, certain memory 108c from other memory 108a. FIG. 1B provides an exemplary implementation of hardware platform 106.

Hardware platform 106 may comprise one or more chasses 110. Chassis 110 may refer to the physical housing or platform for multiple servers or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together in any combination or arrangement.

The characteristics of each chassis 110 and each server 112 may differ. For example, FIG. 1B illustrates that the number of servers 112 within two chasses 110 may vary. Additionally or alternatively, the type or number of resources 110 within each server 112 may vary. In an aspect, chassis 110 may be used to group servers 112 with the same resource characteristics. In another aspect, servers 112 within the same chassis 110 may have different resource characteristics.

Figure 2:
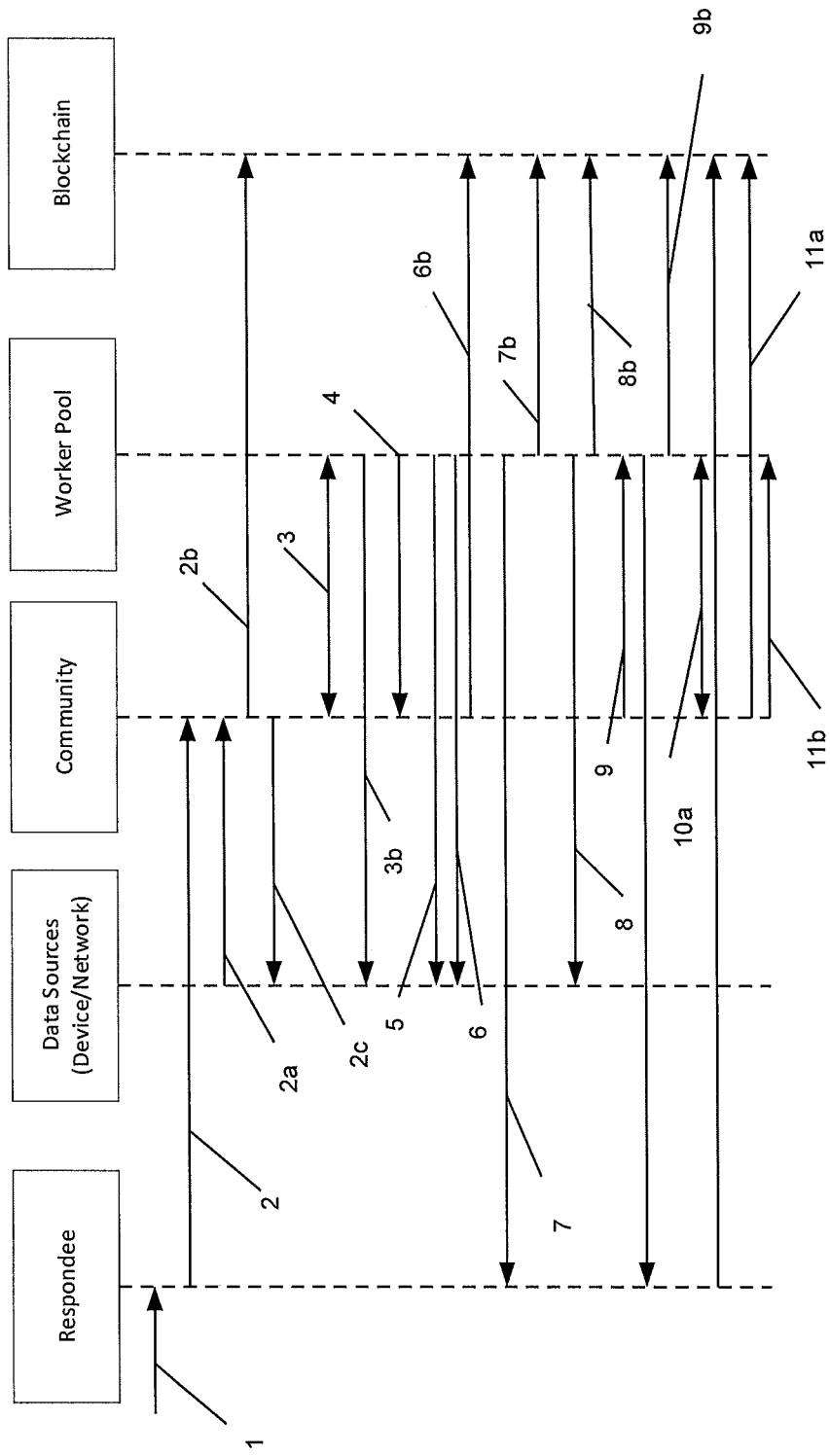
FIG. 2 is a representation of a data and context based role management system according to an example.

FIG. 2 shows a representation of a system 200 according to an example of the disclosure. System 200 generally includes a discovery module that detects an alert seeking a response. A respondee 210 may be an individual or device that needs to be matched with a responder by the system 200. Device 212 may be any device in a network 100. Network 100 may be a central network, peer to peer network, local area network or other communications network. Device 212 includes data sources 214. The data sources 214 may vary with the device and include various types of data including location information, biometric data, and other information. It will be understood that the same data sources 214 may also be stored within a network to which the device is connected or a user profile is stored.

The system 200 may perform operations including identifying a capable responder to address a particular need, problem or the like. With reference to FIGS. 2 and 2D, operations of the system 200 will be described according to one example. Preliminary operations may include instantiating a community and instantiating a discovery module to monitor network 100 for an alert. As described herein, these operations may be combined in the sense that discovery module may instantiate a community in response to the specific alert. These steps are generally indicated by the number 280 in FIG. 2D.

In the example shown in FIG. 2, upon receiving an alert identifying respondee 210, system 200 may gather cloud data at step 1 relating to respondee 210 including but not limited to identification, personal information, location, biometric information and data sources 214 associated with the respondee's device 212. As discussed more completely below, system 200 may search for a community 230 in response to an event or define a community 230 for the event E at step 2. System 200 may transmit the cloud data to a community 230 at step 2a. The alert and event E may be recorded to a ledger or other permanent memory at step 2b. At step 2c, community 230 may seek additional cloud data from the respondee's device to refine the alert. For example, if not obtained initially, community 230 may obtain location information or other information to define the scope of the problem and appropriate criteria for a search.

At step 3, system 200 searches community 230 to identify a responder. For example, community 230 may include a connection to a worker pool data source containing the identities and credentials of potential responders. At step 3b, community 230 may refine this search by obtaining additional data from the potential responder's device, such as location, additional qualification information or a signal from potential responder to confirm the ability to respond, such as an opt in signal. Optionally at step 4, system 200 may escalate the community search to look for a responder with higher qualifications. At step 5, system 200 promotes responder granting responder data access. This step may include delivering data, functionality or other tools to the responder based on the event. Optionally, and as needed, system 200 may further include a signal to the respondee's device to obtain additional data that may assist the responder. For example, this operation may seek the location of the respondee's device to help locate the event. This operation may obtain information available from the device under original device settings or alter these settings temporarily to address the event. For example, a respondee may have location services off or a privacy setting that prevents the location from being shared. To address an emergency event, the location services setting may be altered to turn these services on or the privacy setting may be altered to allow the location to be shared.

System 200 may at step 6 promote the responder to provide data access, communication priority and the like. In the emergency example, a responder could obtain access to data that is normally protected by a privacy setting such as location, biometric information, health records, allergies, blood type, and the like. Service upgrades could include providing additional bandwidth to provide large amounts of data in a short period of time and to facilitate video calls or other information transfers to and from the responder. At step 7, responder is dispatched to respondee 210. Optionally, this step may be recorded in a permanent memory at step 7b. Further operations, steps 8 and 8b, may include transferring the data, tools, and privileges to one or more additional responders identified in step 5 or those that arrive at the event. If there is a hand off from one responder to another, the operations may include de-promoting the first responder to return access levels to data, functionality and other tools to an original status at step 9. The hand off and de-promotion may be recorded in ledger at step 9b.

In steps 10 and 11, the system 200 may continue to address additional issues that arise through the progression of the event, and as necessary, instantiate subcommunities to address additional issues. For example, in the emergency event example, the event may progress from use of a health care provider to provide a response, to contacting respondee's insurance carrier to begin claims processing etc. The system 200 may create a subcommunity to identify an insurance responder and transmit data from the event to assist in claims processing.

Figure 2A:
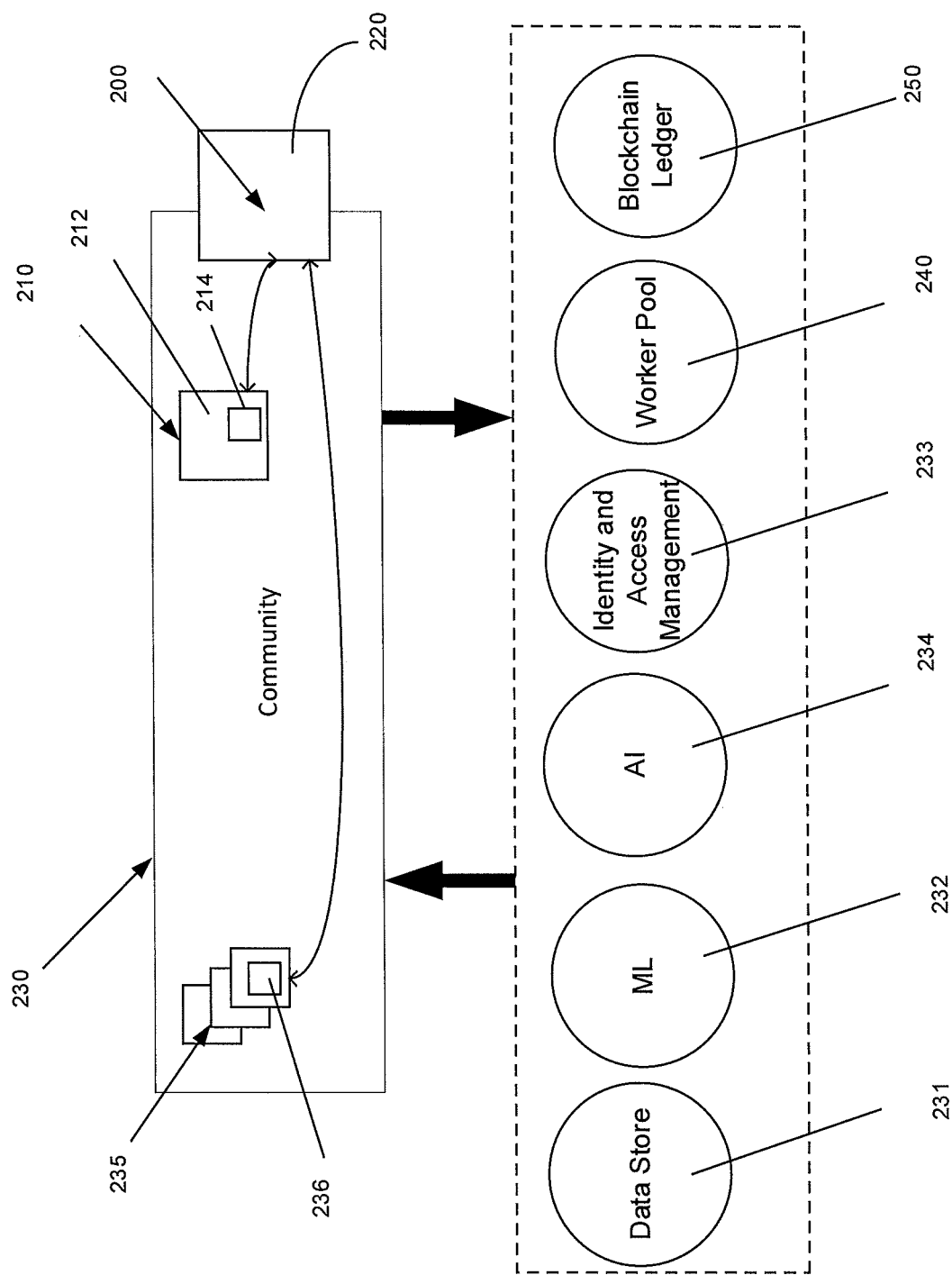
FIG. 2A is a representation of the system according to another example.

With reference to FIG. 2A, system 200 includes a discovery module 220. Discovery module 220 is configured to search a community 230 to identify a responder. Community 230 is a managed asset and may be instantiated as a network device or virtual network function. Community 230 includes a cohesive set of functionality including software defined networking, orchestration and analytics to enable data sharing and collaboration. Community virtual network functions enable dynamic, on-demand combinations of data sourced from one or more entity and merged into a community 230 to derive insights in a highly secure environment. The community 230 may be closed in the sense that access controls or security functions are in place to execute user privacy settings, network policies, government regulations or other limitations on access to the data and related functionalities within community 230. Identity and access management 233 may orchestrate and monitor access to the community 230. For purpose of analytics, community 230 may include a machine learning tool 232 and an artificial or augmented intelligence tool 234. These tools may be instantiated as a network device or virtual network function within a SDN. The community 230 may optionally include a worker pool 240.

A community 230 includes at least one role, generally indicated at 235. The role 235 may have an identity 236 that is stored within the community or exists within a data store 231 or ledger 250 accessible by the community. The identity may refer to an individual user, internet of things device, sensor, function, a virtual network function, machine or other device. A role 235 may also be the role of an individual including but not limited to an occupation, a rank, a set of qualifications, a certification or the like. A community is defined and stored within a data platform in a network 100, such as for example, an Indigo(r) platform or the like. In one example, community 230 includes identities 236 logged within an audit ledger 250, such as a blockchain ledger 252.

A first responder example will be described below. In this example, system 200 includes a data structure that defines a community based on roles, credentials and qualifications. The data structure may include a user identity that stores the user's role, qualifications and credentials. Data structure may include a memory, data store, blockchain ledger or other record accessible via network 100. In the first responder community, for example, the users may be required to have medical training, law enforcement training, military training or other specialized skills that are pertinent in emergency response situations. These skills, degrees, or certifications may be stored in memory, a data store, or form part of that user's blockchain ledger. These qualifications may be stored in disparate locations but accessible in the context of the community 230 defined by a first responder role. A first responder community, therefore, may include user profiles or members that have been added to the community on a voluntary, i.e. opt-in basis, or by enrollment by an employer or other certification body. It will be understood that the system 200 may also instantiate a community 230 in response to an event. In this situation, when alerted to an event, system 200 populates a community by performing searches within the network 100 for credentials, functions, or capabilities, collectively indicated by the letter C, pertinent to the event E. The search criteria may be stored within memory of system 200 and/or developed through use of the artificial/augmented intelligence and machine learning functions of system 200.

Figure 2B:
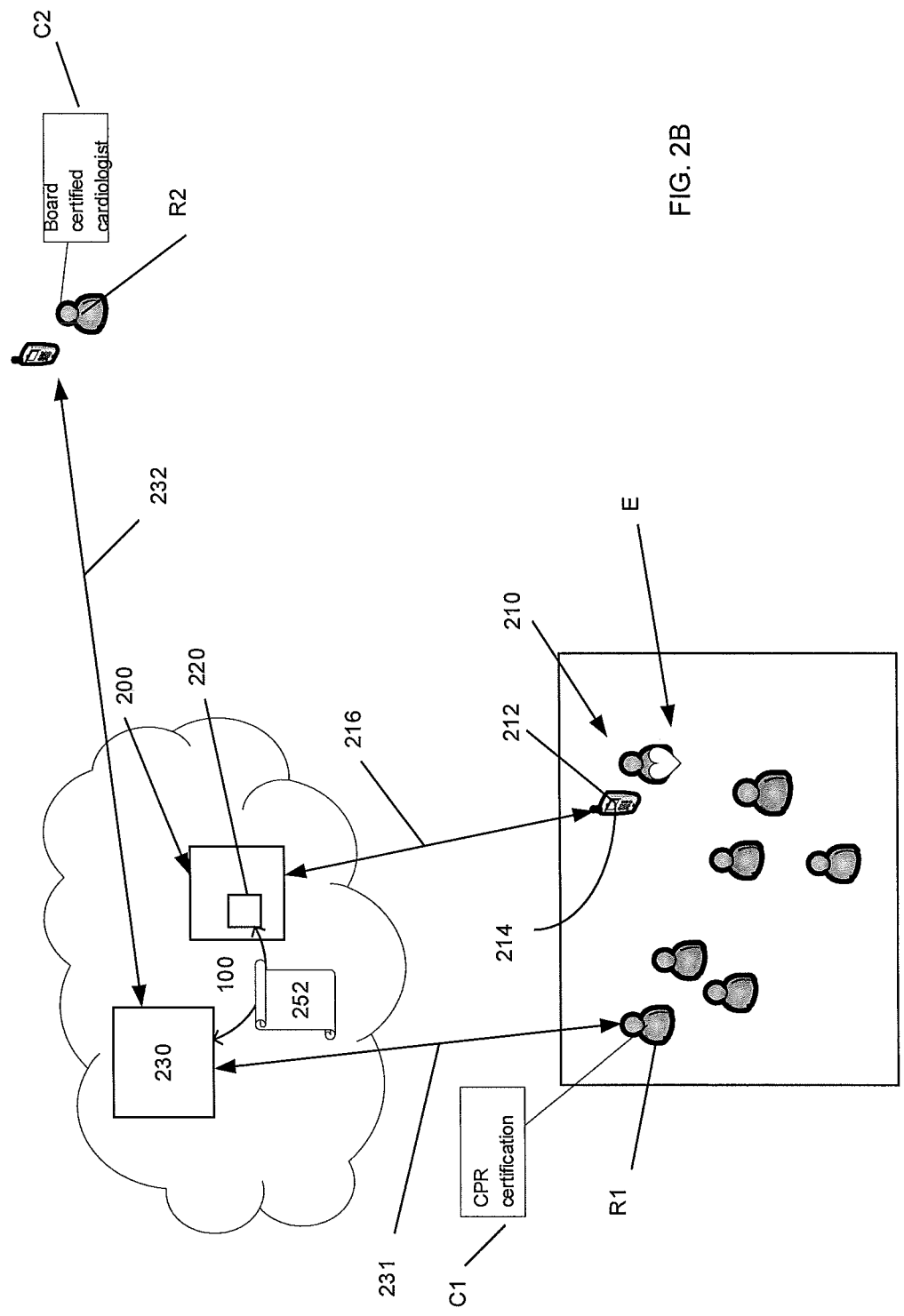
FIG. 2B is a representation depicting operation of the system in an emergency response example.

Event E may be any problem or occurrence that generates a need for a response or solution. The example events discussed below are not limiting. With reference to FIG. 2B, an example of a medical event is discussed. This event E may also be referred to as a first responder scenario. The event E may occur within a dense population, for example, at a conference. There, an individual, i.e. a respondee 210, experiences a medical emergency such as a heart attack. Either through biometric automation from the respondee's device(s) 212 or by an explicit request by respondee 210, a medical alert 216 is sent to system 200 indicating the respondee's condition. The instantiation of the event E within the network 100 may trigger system 200 to contact to the respondee's device 212 to confirm the event E or obtain additional information to assist a discovery process. For example, upon detecting an event, system 200 may communicate with respondee's device 212 to determine respondee's device location. If biometric information is available from the device, this information may be monitored to further assess the event E. For biometric use, system may switch profiles or mode to alert responder community 230 and enable additional permissions for use of biometric data review or publication that may be contrary to normal, non-emergency, use-settings. System 200 may create an audit log 252 relating to the event and including information available from the respondee's device including but not limited to audio, video, biometric data, location data, motion data, and the like. System 200 may also upgrade service to the device to provide highly specific location information.

System 200 may include a discovery module 220 that identifies potential first responders. As described above, discovery module 220 may include artificial/augmented intelligence sources and machine learning to create search criteria and establish connections with appropriate data sources to identify at least one responder based on the information available about the event. As indicated, system 200 may use discovery module 220 to instantiate a community or access an existing community to identify a responder for the event E. Discovery module 220 may search for a responder with credentials, training, or other capabilities pertinent to the event. In the heart attack example, discovery module 220 identifies anyone with health care training including individuals with EMT training, medical professionals, retired medical professionals etc. . . . . System 200 may include additional search criteria including but not limited to specialized credentials such as CPR training, certification as a cardiologist or other skills relevant to the particular event. Other criteria may include geographical information including location information from the potential responder's device to determine proximity to the emergency event E. The criteria and results may be analyzed through the AI 234 to weight or rank the results and identify one or more responders. For example, system 200 may select a first responder R1 based on the responder being close to the emergency and having at least medical training if no other responders with additional credentials are close by. A second responder R2 may also be identified that has better qualifications for the emergency but is farther away. Both the first responder and second responder may be alerted.

Matches may thus be found based on partial credentials or historical uses. In addition, system 200 may broadcast an alert signal to a community to prompt an opt-in signal from a community member to act as a responder. In this situation, the alert may include information about the type of event and location to prompt an appropriate opt-in signal. The opt-in signal may include credentials and location for the potential responder that would be assessed by the system 200 before identifying the appropriate responder. System 200 may constrain matches based on credentials, distance, time to arrive or other criteria.

Continuing with the example, system 200 identifies a first responder R1 with credentials C1 indicating a CPR certification at the conference and sends a first responder signal 231 directing the first responder R1 to the event location and promote first responder R1 to a community for the event. As part of the promotion operation, system 200 may also provide first responder R1 data rights to respondee's medical records, biometric information, and other available data of historical or present significance to the event. System 200 may also provide network priority for first responder's data access on first responder's device.

While promoting first responder R1, system 200 may continue to search for higher privilege to medical care, such as a city-based EMS unit or other more qualified individuals in the area. This further searching may identify a second responder R2 having credentials C2 indicating that she is a cardiologist. System 200 may likewise promote and dispatch second responder R2 to the event E via a second responder signal 232. When second responder R2 arrives at the event E, second responder R2 may relieve first responder R1 and take over. When this occurs, a relief signal 218 may be sent to system 200 causing system to de-promote first responder R1 to remove access and priority temporarily assigned for purposes of responding to the event. It will be understood that this de-promotion may occur instantly when a relief signal is received or there may be delay to allow for debriefing or to otherwise allow first responder R1 to upload information or report on event.

System 200 may continue to iteratively dispatch and promote responders until regular members of a community arrive or the respondee is conveyed to them. It will be understood that the promotion of responders is not limited to individuals through their devices but may include other roles and identities including IoT devices, virtual network functions and the like. In the heart attack example, connected video devices at the conference may be promoted to obtain video data from the event and add it to the community log. Sub-communitees may also be created for live data conveyence and post event logging. The logged information may contribute to respondee's medical records as well as responder community information for the first responder R1 and any additional responders R2 . . . Rn. System 200 may analyze all logged information to develop response strategies, role assignments, and future selection of responders and search criteria.

System 200 provides a faster response to temporary data dictated by the role of the responder. Following the health emergency example, the responder R1 may be temporarily be provided with access to respondee's biometric data, medical history and other pertinent data accessible within community. This temporary data may also include system 200 releasing any privacy controls or automatically conveying a role to responder R1 to allow access to data that would not otherwise be available. In addition, based on assigment of the first responder role, system 200 may manipulate network and device capabilities including but not limited to providing increased bandwidth, priority communication routing, automatic logging capability and the like.

Figure 2C:
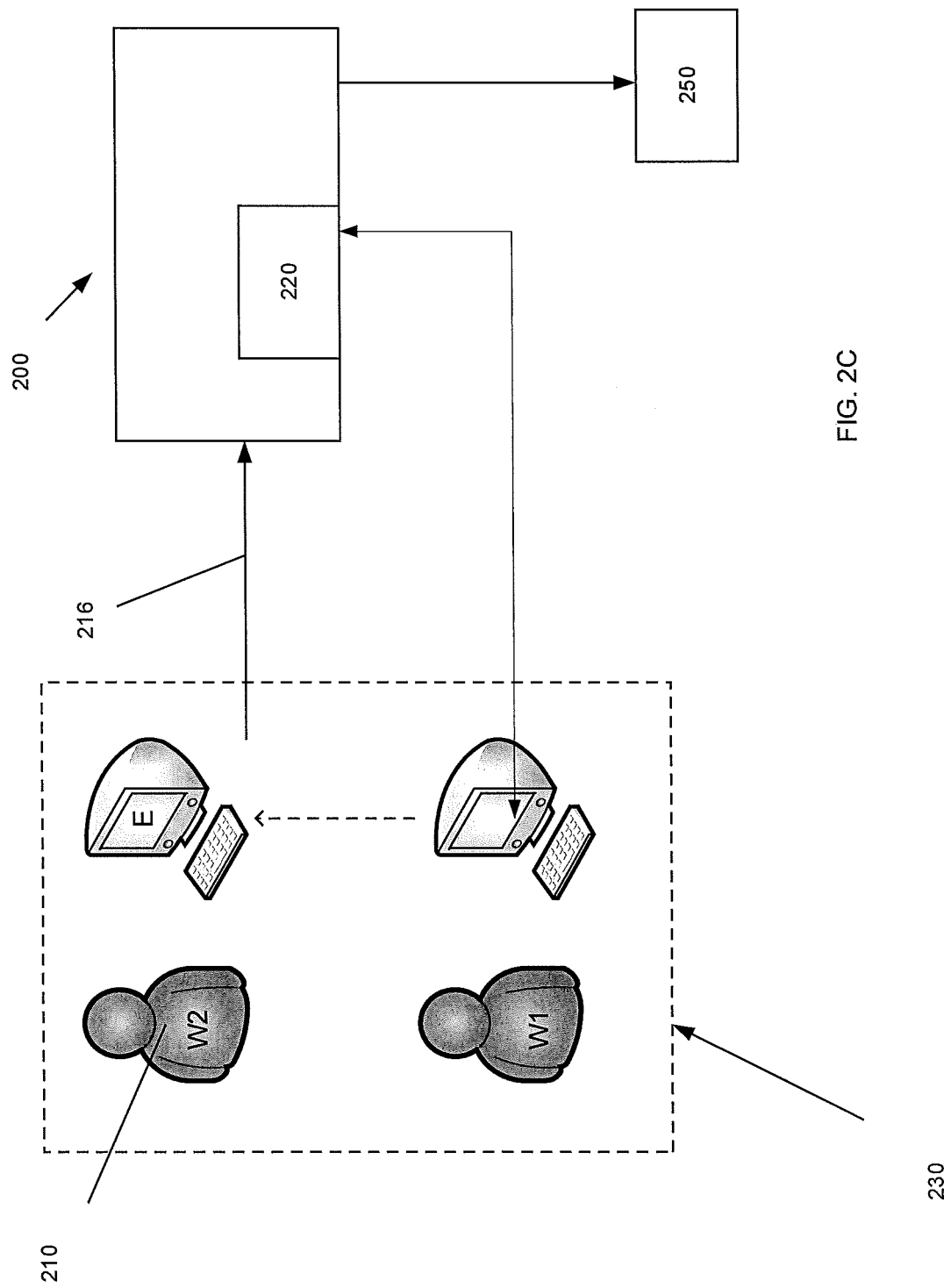
FIG. 2C is a representation depicting operation of the system in a technician example.
Figure 2D:
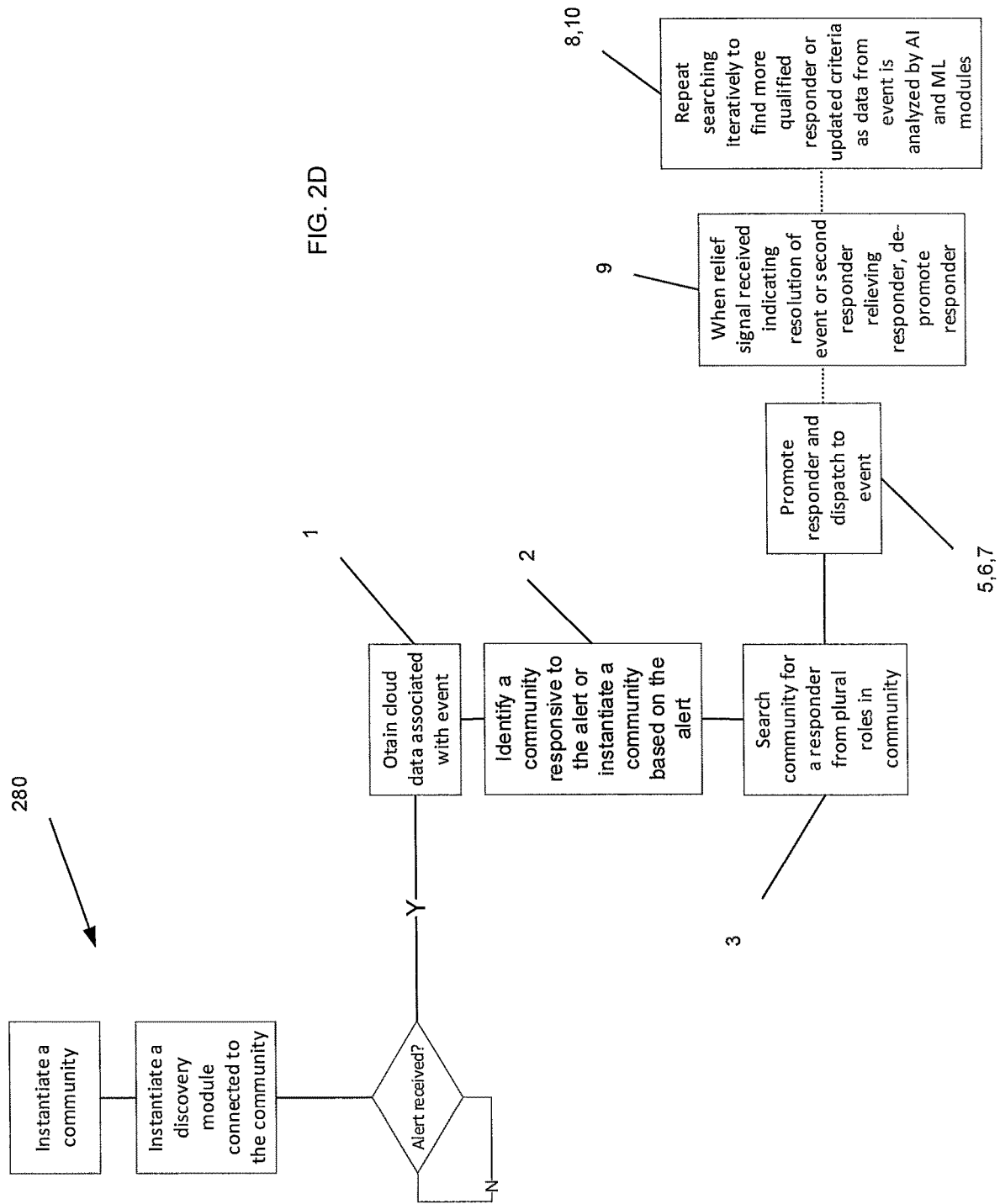
FIG. 2D is a flow diagram depicting operation of a system according to an example.

With reference to FIG. 2C, an alternate example is provided where event E involves a problem that requires a technician. In this example, a first worker W1 at a service provider company works at the company for a period of years gaining community roles and responsibilities, for example labeled as a core technician role. At some stage, first worker transitions to a new job within the same company or leaves to go to a new company. The role core technician role is taken away, and this event is logged in permanent memory. A second employee may be hired and assigned the core technician role. In the example, second worker W2 encounters a problem that he cannot solve, i.e. event E, and he sends an alert 216 to system 200 requesting assistance. System 200 notifies community 230 associated with the core technician role. System 200 may employ a discovery module 220 to search for workers or other responders within this community 230 to address the issue. The system 200 may identify first worker based on prior experience in the core technician role. Once identified as a responder, system 200 may promote first worker to the core technician role temporarily to allow first worker to assist with the issue faced by second worker. As in the previous example, through the promotion step, first worker may be given access to data, functionality, IoT access, and the ability to take actions to address the issue. The promotion may be logged in permanent memory. When the issue is resolved, system 200 may demote first worker to remove the core technician role and all of the access and data privileges. The demotion event could also be logged. As in the first responder scenario, there may be a delay after the issue is resolved to allow first worker access for a period needed for reporting or other data sharing within the community.

It will be understood that the example communities are not limiting. In addition, the event is not limited to the types of problems described above. System 200 may be used to seek responders or opportunistically create communities for other purposes including but not limited to hobby communities (activities, shared interests etc); human resource communities or a gig economy for hiring employees or contractors through data role assignment; certification or membership organizations (HIPPA, EMS, police forces etc); and the like. The machine learning and artificial/augmented intelligence modules within a community may perform advanced data analytics to develop trends, predictions of events, and recruit additional members to the community.

Figure 3:
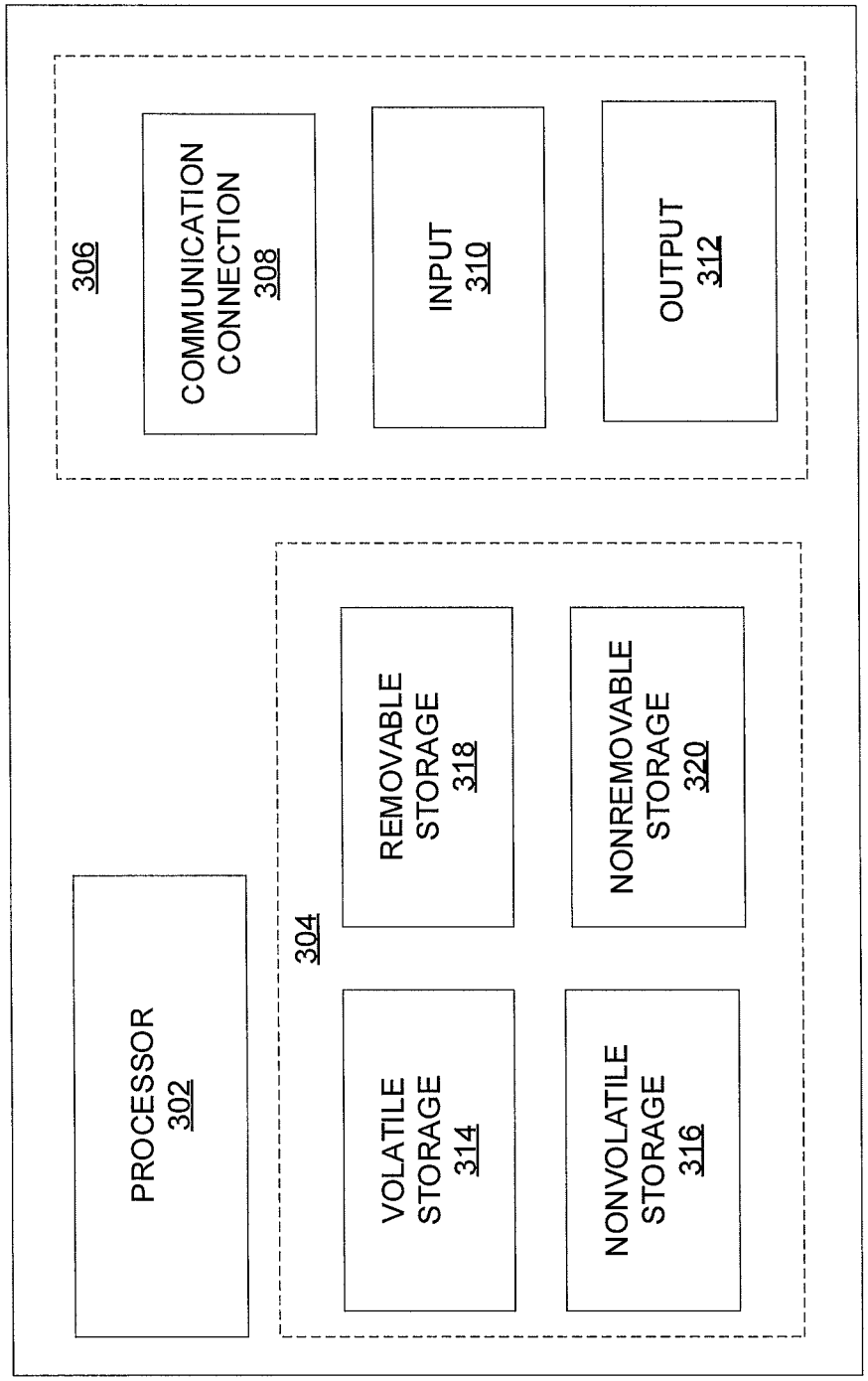
FIG. 3 is a representation of a network device according to an example.

FIG. 3 illustrates a functional block diagram depicting one example of a network device, generally indicated at 300. Network device 300 may comprise a processor 302 and a memory 304 coupled to processor 302. Memory 304 may contain executable instructions that, when executed by processor 302, cause processor 302 to effectuate operations associated with translating parallel protocols between end points in families as described above. As evident from the description herein, network device 300 is not to be construed as software per se.

In addition to processor 302 and memory 304, network device 300 may include an input/output system 306. Processor 302, memory 304, and input/output system 306 may be coupled together to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), electrical means, or a combination thereof. In an example configuration, input/output system 306 may comprise a Wi-Fi finder, a two-way GPS chipset or equivalent, or the like, or a combination thereof. Bluetooth, infrared, NFC, and Zigbee are generally considered short range (e.g., few centimeters to 20 meters). WiFi is considered medium range (e.g., approximately 100 meters).

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

System for indirect BGP routing 200 may reside within any network to facilitate communication between edge routers from disparate network families and services. The following are example networks on which system 200 may reside. For purposes of centrality, system 200 may reside within a core network shown in the various examples below. However, it will be understood that system 200 may reside on any network edge router or network device providing the same function in connection with customer VRFs including but not limited to telecommunications networks, internet, and other networks described more completely below.

Figure 4:
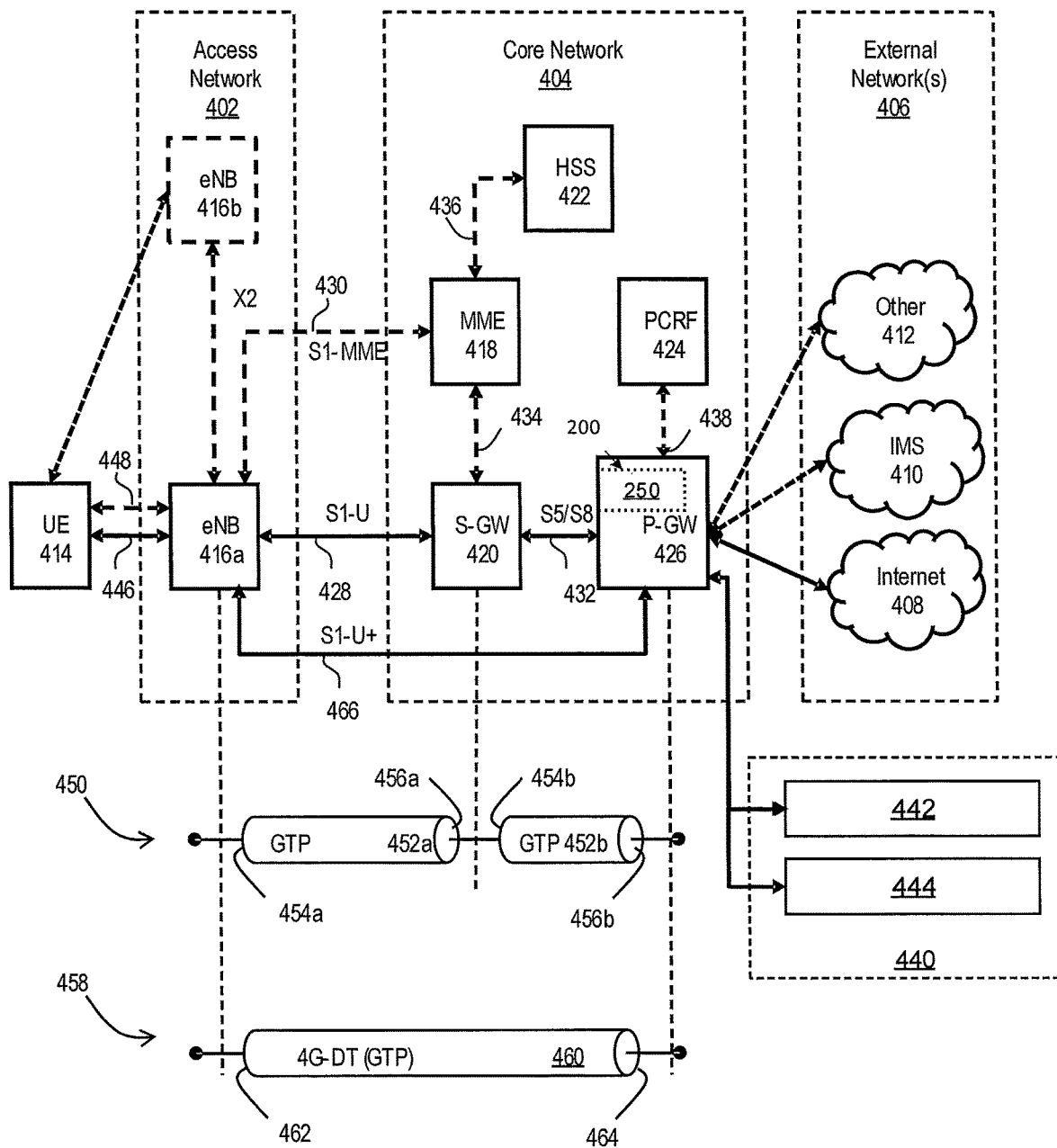
FIG. 4 depicts an exemplary communication system that provide wireless telecommunication services over wireless communication networks that may be at least partially implemented as an SDN.

FIG. 4 illustrates a functional block diagram depicting one example of an LTE-EPS network architecture 400 that may be at least partially implemented as an SDN. Network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (EU-TRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMES 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456*b* corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416*a* and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416*a* and PGW 426, by way of SGW 420. That is, SGW 420 can serve a relay function, by relaying packets between two tunnel endpoints 416*a*, 426. In other scenarios, direct tunneling solution 458 can forward user data packets between eNB 416*a* and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
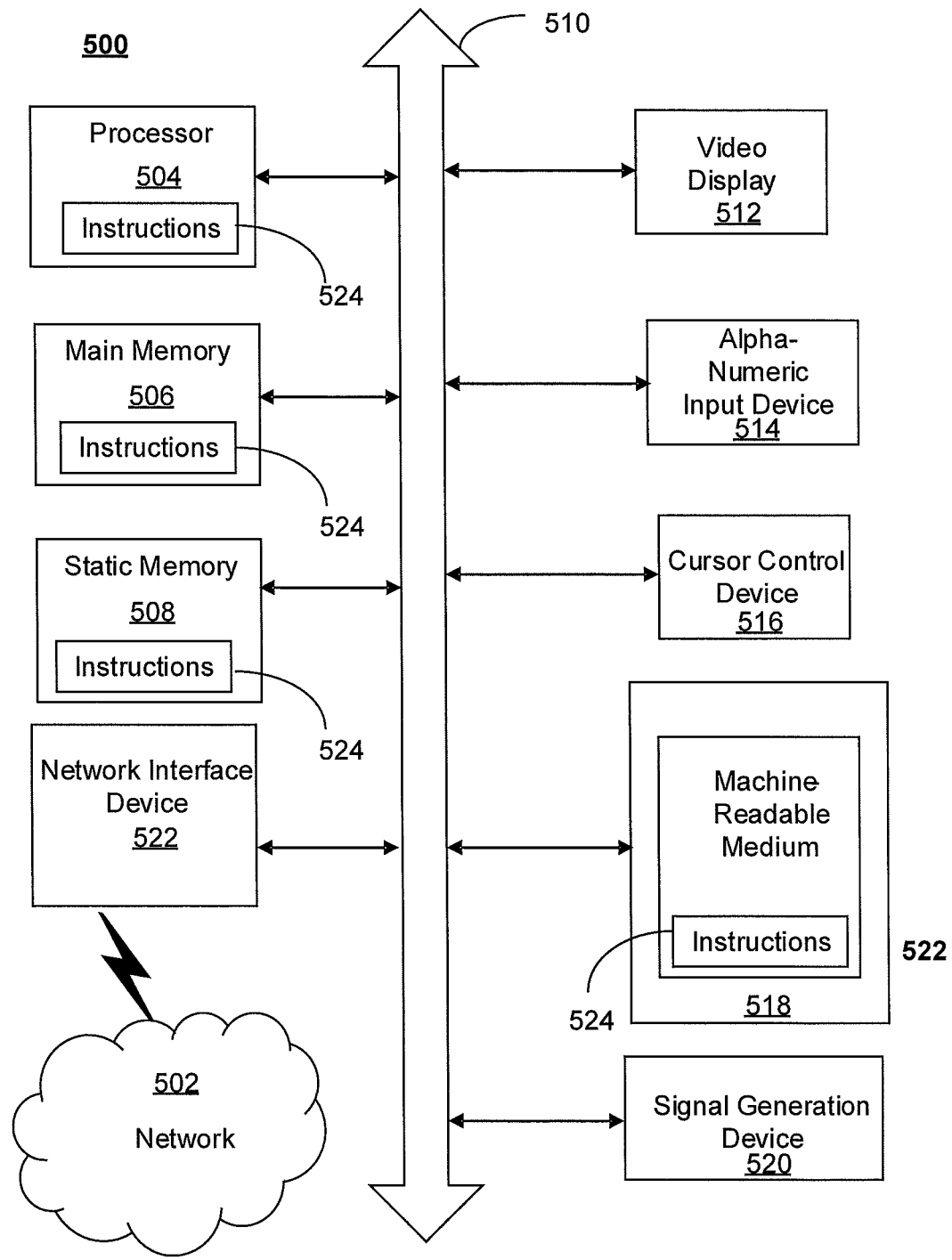
FIG. 5 depicts an exemplary diagrammatic representation of a machine in the form of a computer system.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
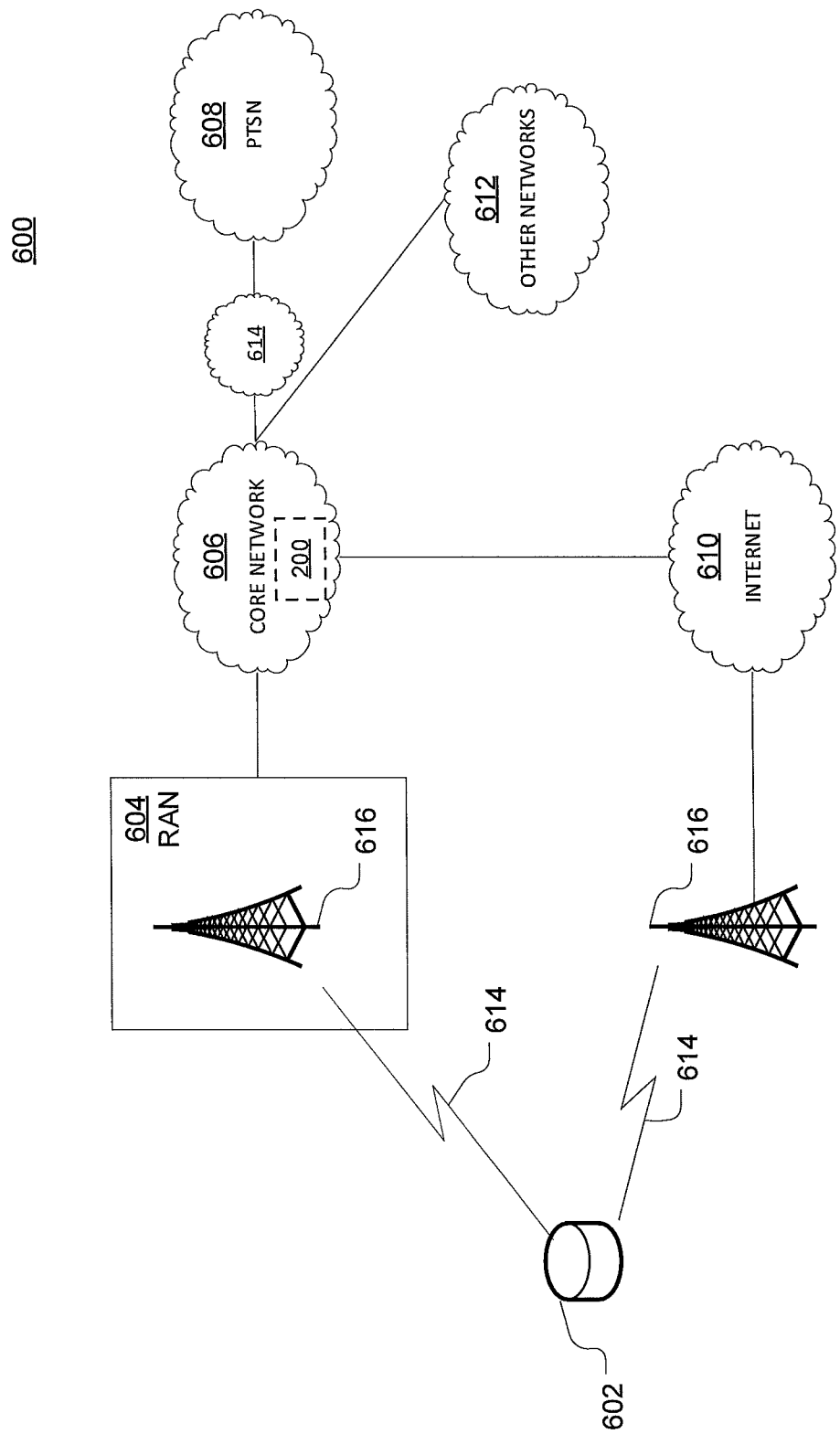
FIG. 6 is a representation of a telecommunications network.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise drone 102, a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
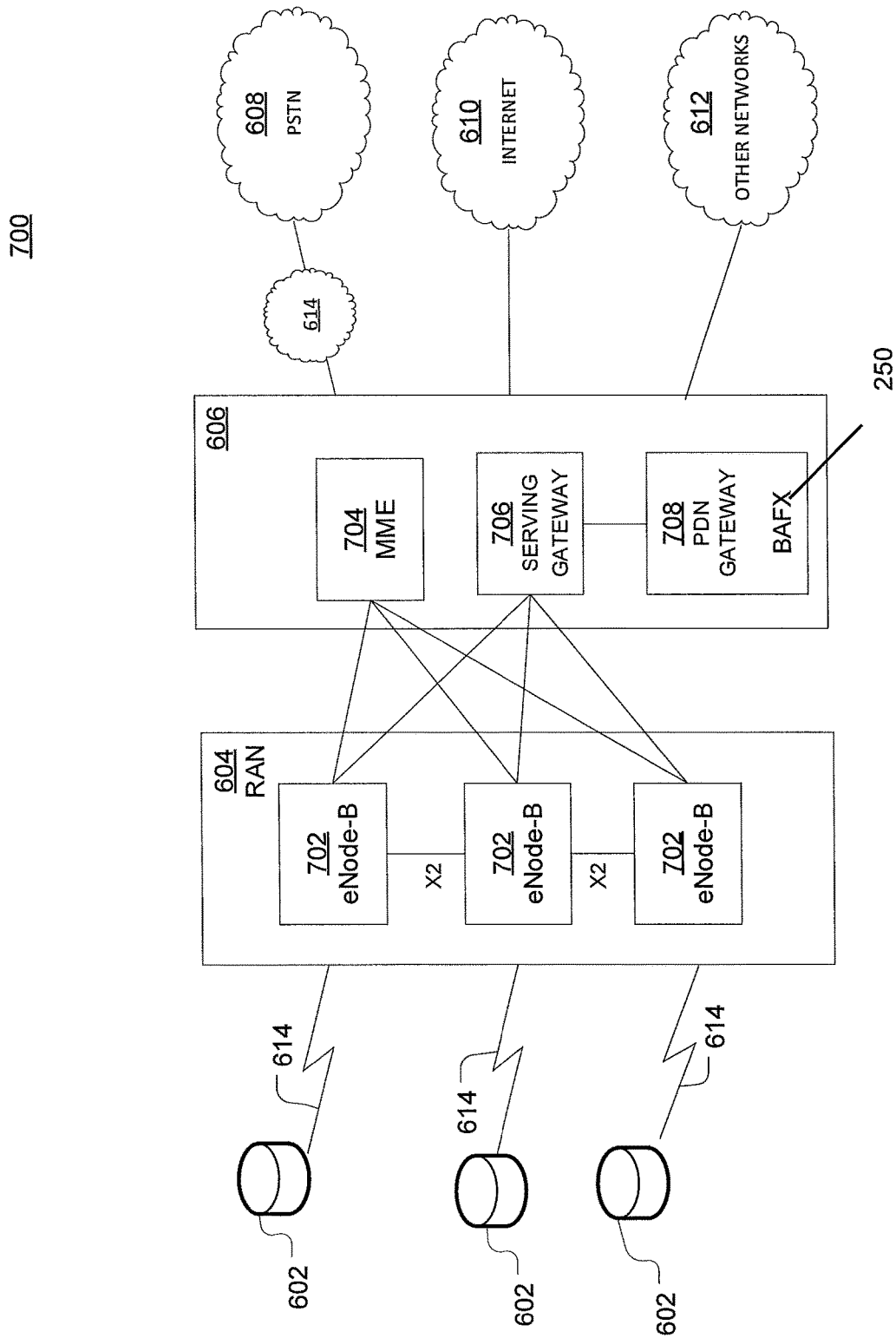
FIG. 7 is a representation of a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WIRUs 602 and traditional landline communications devices. In addition, core network 606 may provide the WTRUs 602 with access to other networks 612, which may include other wired or wireless networks that are owned or operated by other service providers.

Figure 8:
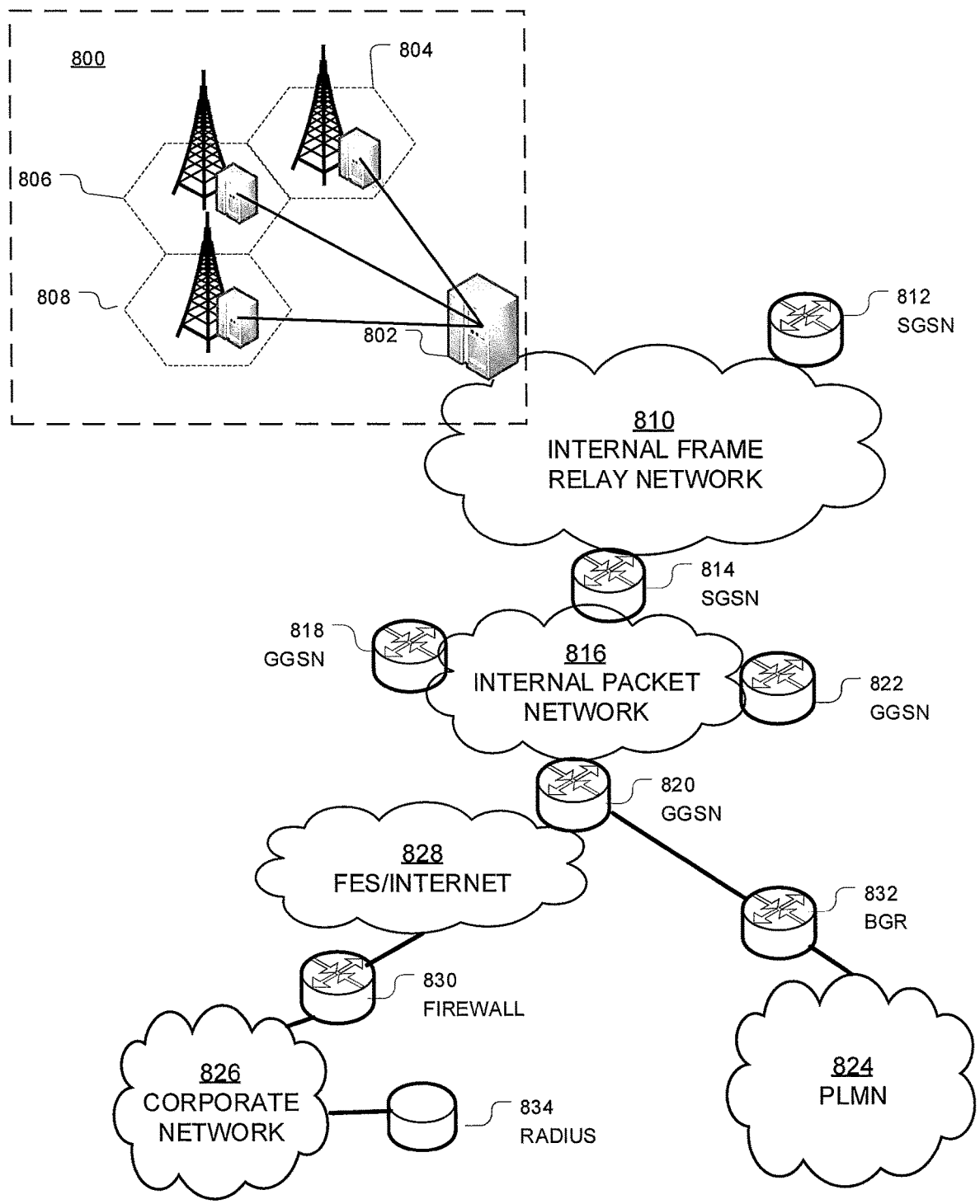
FIG. 8 is a representation packet-based mobile cellular network environment.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
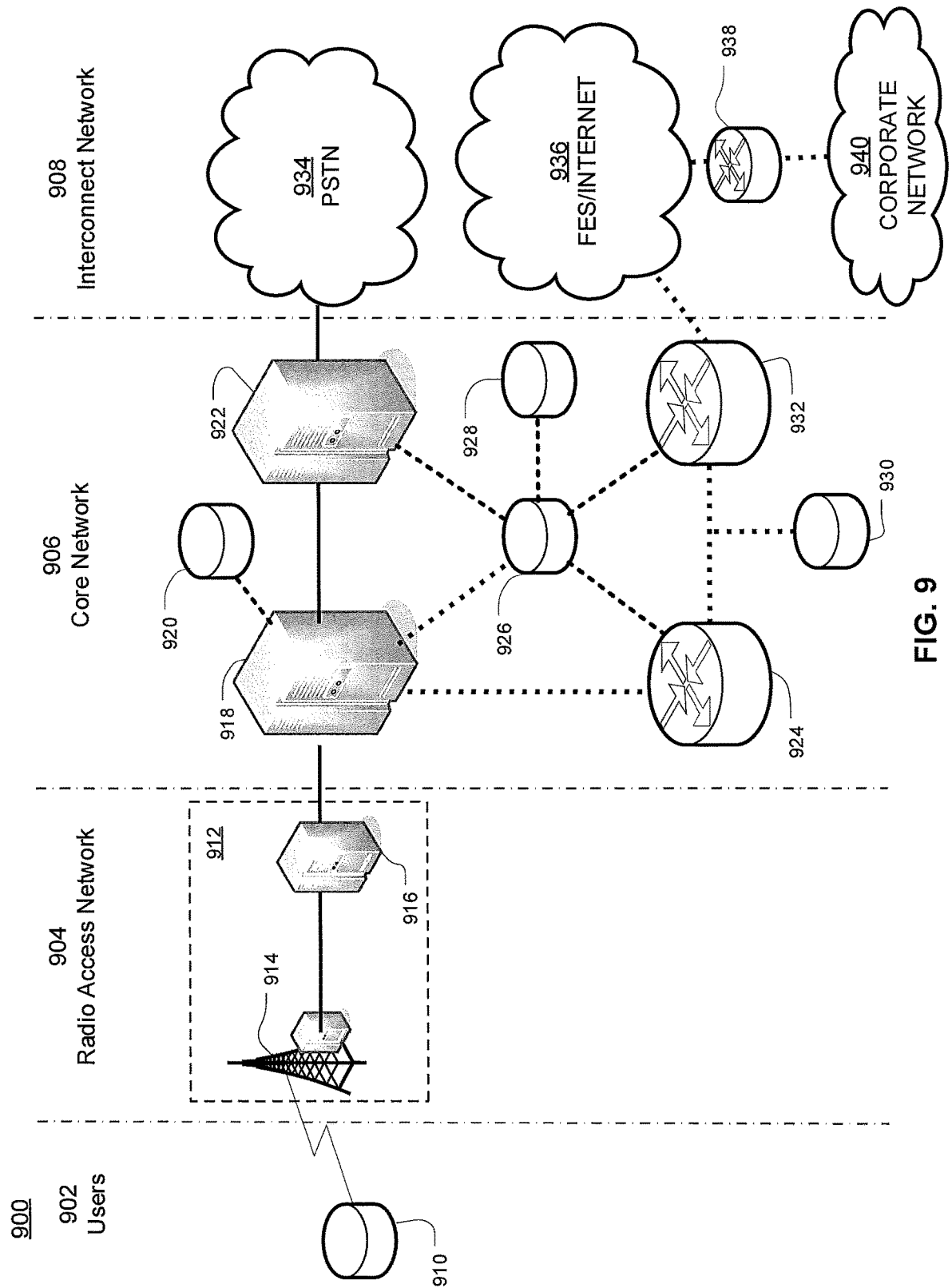
FIG. 9 is a representation of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038 (FIG. 10), or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service.

When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
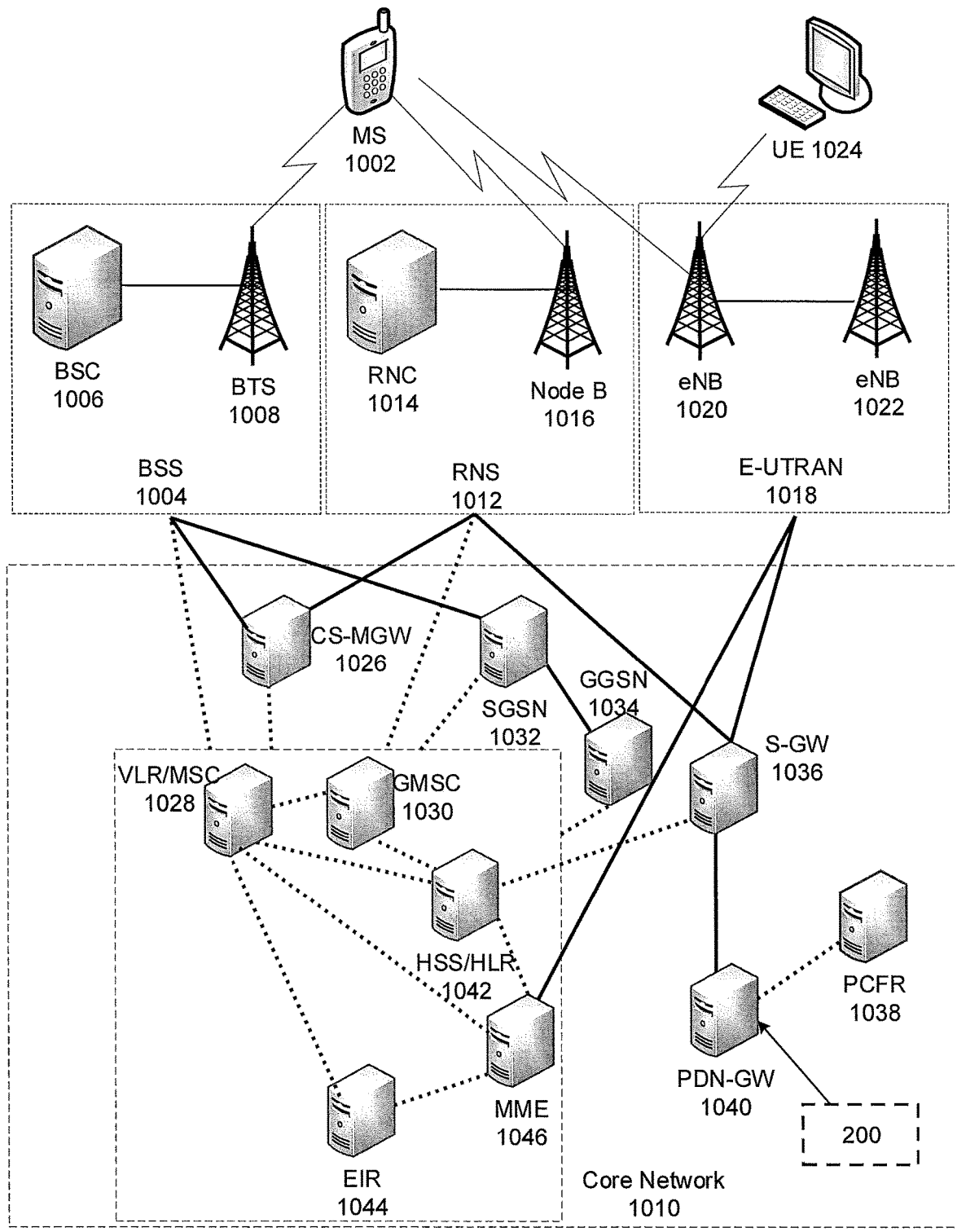
FIG. 10 is a representation a PLMN architecture.

FIG. 10 illustrates a block diagram of an example PLMN architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life— especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

EXAMPLES

Example 1. A data and context based role management system comprising a community, the community including at least one data source having plural roles stored therein, the plural roles including an identity including at least one of a credential, a function, a capability, and a historic response data; a discovery module configured to identify an alert associated with an event requiring a response, the discovery module being further configured to search the community for a responder based on the event, wherein the discovery module is configured to compare a criteria based on the event to the identity associated with each of the plural roles to identify the responder; and when the responder is identified, the community promotes the responder to transform at least one device of the responder to provide at least access to data associated with the event.

Example 2. The system of example 1, wherein the data associated with the event includes at least one data source from a respondee device associated with the event.

Example 3. The system of example 1, wherein the community further comprises an Artificial Intelligence instantiated as a virtual network function or network device, wherein the discovery module communicates data from the event to the artificial intelligence, and wherein the artificial intelligence is configured to redefine the criteria based on the data from the event.

Example 4. The system of example 3, wherein the community further comprises a machine learning module instantiated as a virtual network function or network device, the machine learning module communicating with the artificial intelligence to further refine the criteria based on the data from the event.

Example 5. The system of example 1, wherein the community is configured to de-promote the responder after a relief signal is received from the event.

Example 6. The system of example 5, wherein the community is configured to de-promote the responder after a selected time period following receipt of the relief signal.

Example 7. The system of example 6, wherein the community is configured to prompt the responder for a report of the event during the selected time period.

Example 8. The system of example 1, wherein the community logs the promotion of the responder in a blockchain ledger.

Example 9. The system of example 1, wherein the community updates the identity of the responder in a blockchain ledger after promotion.

Example 10. The system of example 1, wherein the community provides device priority to the responder with the promotion.

Example 11. A network device comprising: a processor, an input/output device coupled to the processor, and a memory coupled with the processor, the memory comprising executable instructions that when executed by the processor cause the processor to effectuate data and context based role management operations comprising: instantiating a community within a network, the community including plural roles; when an alert indicating an event requiring a response is detected by a discovery module, obtaining cloud data from a device associated with the event, searching the community to identify a responder from the plural roles, promoting the responder to provide access to the cloud data, and dispatching the responder to the event.

Example 12. The network device of example 11, wherein the step of promoting includes providing priority data service to the responder.

Example 13. The network device of example 11, wherein the step of promoting includes providing access to at least one of a virtual network function, an internet of things device, a data source, and a location data.

Example 14. The network device of example 11, wherein the searching step includes identifying the responder based on a criteria including at least one of a credential, a proximity to the event, and an experience with similar events.

Example 15. The network device of example 14, wherein each role within the community includes a blockchain ledger.

Example 16. The network device of example 11, wherein the event is a medical emergency, and wherein the community is a first responder community.

Example 17. The network device of example 11, wherein the event requires a technician.

Example 18. The network device of example 11 wherein the step of dispatching includes sending an opt-in signal to a device associated with the responder.

Example 19. The network device of example 11 further comprising while dispatching the responder, iteratively searching for at least one second responder and dispatching the at least one second responder, wherein the iteratively searching operation includes at least one of searching for a better match to the criteria, revising the criteria as data is received from the event using a machine learning module and an artificial intelligence module connected to the community.

Example 20. The network device of example 19 further comprising the step of de-promoting the responder when the community receives a relief signal indicating that the event is resolved or a second responder has relieved the responder.

The invention claimed is:

1. A network device comprising: a processor, an input/output device coupled to the processor, and a memory coupled with the processor, the memory comprising executable instructions that when executed by the processor cause the processor to effectuate data and context based role management operations comprising:
    defining a community within a network, the community including at least one data source having plural roles stored therein, the plural roles including an identity including at least one of a credential, a function, a capability, and a historic response data; and
    when an alert indicating an event requiring a response is detected by a discovery module:
        obtaining cloud data from a device associated with the event;
        searching the community to identify a responder from the plural roles;
        sending an opt-in signal to a device associated with the responder;
        receiving a confirmation from the responder confirming an ability to respond to the event; and
        promoting the responder to provide access to the cloud data, and dispatching the responder to the event.

2. The network device of claim 1, wherein the step of promoting includes providing priority data service to the responder.

3. The network device of claim 1, wherein the step of promoting includes providing access to at least one of a virtual network function, an internet of things device, a data source, and a location data.

4. The network device of claim 1, wherein the searching the community to identify a responder from the plural roles comprises identifying the responder based on a criteria including at least one of a credential, a proximity to the event, and an experience with similar events.

5. The network device of claim 4, wherein each role within the community includes a blockchain ledger.

6. The network device of claim 1, wherein the event is a medical emergency, and wherein the community is a first responder community.

7. The network device of claim 1, wherein the event requires a technician.

8. The network device of claim 1 further comprising while dispatching the responder, iteratively searching for at least one second responder and dispatching the at least one second responder, wherein iteratively searching operation for at least one second responder and dispatching the at least one second responder comprises at least one of searching for a better match to a criteria, revising the criteria as data is received from the event using a machine learning module and an artificial intelligence module connected to the community.

9. The network device of claim 8 further comprising the step of de-promoting the responder when the community receives a relief signal indicating that the event is resolved or a second responder has relieved the responder.

10. A method comprising:
defining a community within a network, the community including plural roles; and
when an alert indicating an event requiring a response is detected by a discovery module,
obtaining cloud data from a device associated with the event, searching the community to identify a responder from the plural roles,
sending an opt-in signal to a device associated with the responder,
receiving a confirmation from the responder confirming an ability to respond to the event, and
promoting the responder to provide access to the cloud data, and dispatching the responder to the event.

11. A data and context-based role management system comprising:
one or more processors;
a memory coupled with the one or more processors, the memory comprising executable instructions that when executed by the one or more processors cause the processor to effectuate operations comprising:
defining a community within a network, the community including at least one data source having plural roles stored therein, the plural roles including an identity including at least one of a credential, a function, a capability, and a historic response data; and
when an alert indicating an event requiring a response is detected by a discovery module:
obtaining cloud data from a device associated with the event;
searching the community to identify a responder from the plural roles;
sending an opt-in signal to a device associated with the responder;
receiving a confirmation from the responder confirming an ability to respond to the event; and
promoting the responder to provide access to the cloud data, and dispatching the responder to the event.

12. The system of claim 11, wherein the data associated with the event includes at least one data source from a respondee device associated with the event.

13. The system of claim 11, wherein the community further comprises an artificial Intelligence instantiated as a virtual network function or network device, wherein the discovery module communicates data from the event to the artificial intelligence, and wherein the artificial intelligence is configured to refine criteria based on the data from the event.

14. The system of claim 13, wherein the community further comprises a machine learning module instantiated as a virtual network function or network device, the machine learning module communicating with the artificial intelligence to further refine the criteria based on the data from the event.

15. The system of claim 11, wherein the community is configured to de-promote the responder after a relief signal is received from the event.

16. The system of claim 15, wherein the community is configured to de-promote the responder after a selected time period following receipt of the relief signal.

17. The system of claim 16, wherein the community is configured to prompt the responder for a report of the event during the selected time period.

18. The system of claim 11, wherein the community logs the promotion of the responder in a blockchain ledger.

19. The system of claim 11, wherein the community updates the identity of the responder in a blockchain ledger after promotion.

20. The system of claim 11, wherein the community provides device priority to the responder with the promotion.

* * * * *